United States Patent
Hergenrother et al.

[11] 3,798,495
[45] Mar. 19, 1974

[54] ELECTROOPTICAL CORRELATOR TUBE USING SECONDARY EMISSION MODULATION

[75] Inventors: Rudolf C. Hergenrother, West Newton; John W. Lotus, Avon, both of Mass.

[73] Assignee: Raytheon Company, Lexington, Mass.

[22] Filed: Apr. 17, 1968

[21] Appl. No.: 722,052

[52] U.S. Cl. ............. 315/11, 315/12, 324/77 K
[51] Int. Cl. .............................. H01j 31/48
[58] Field of Search .................... 315/10–12; 324/77 G, 77 I

[56] References Cited
UNITED STATES PATENTS

| | | |
|---|---|---|
| 3,474,286 | 10/1969 | Hergenrother .................. 315/11 |
| 3,728,577 | 4/1973 | Osepchuk ........................ 315/11 |
| 2,753,483 | 7/1956 | Lubszynski et al. ............ 315/11 |
| 3,111,666 | 11/1963 | Wilmotte ..................... 324/77 UX |
| 3,220,003 | 11/1965 | Montague et al. ........... 324/77 UX |
| 3,349,231 | 10/1967 | Harmon ........................ 324/77 X |

*Primary Examiner*—Carl D. Quarforth
*Assistant Examiner*—P. A. Nelson
*Attorney, Agent, or Firm*—Harold A. Murphy; Joseph D. Pannone; Edgar O. Rost

[57] ABSTRACT

An electron discharge device of the image orthicon type having a barrier mesh electrode member disposed adjacent to the target mesh electrode of the electron image section. Positive or negative modulation voltage superimposed on the barrier mesh bias relative to the target mesh electrode bias causes secondary electrons produced at the storage target member by the photocurrent to be controlled in such a way as to control the storage target charge distribution. In an electrooptical correlation system this action causes an uncorrelated input signal to cancel out to zero charge effect on the storage target member.

4 Claims, 6 Drawing Figures

INVENTORS
RUDOLF C. HERGENROTHER
JOHN W. LOTUS
BY Edgar O. Rost
ATTORNEY

ELECTROOPTICAL CORRELATOR TUBE USING SECONDARY EMISSION MODULATION

BACKGROUND OF THE INVENTION

In the electronic communications art the employment of electrooptical techniques in the processing of information signals provides for the emergence of modulated light patterns varying in time. Electrooptical integrator devices, particularly such devices employing cross correlation techniques, are desirable in the processing of information to obtain higher resolution in target definition and location in radar systems. For the purposes of this specification the term "cross correlation" shall be interpreted to refer to the multiplication of two functions in the processing of intelligence signals plus the integration and readout by electrical means of the signal waveforms. An area of application resides in aerial reconnaisance and mapping of geographical areas utilizing radio frequency energy.

In the applicable devices electrical signals are converted by elastic waves within a solid birefringent material and in the cross correlation concept these signals are electrically multiplied by a second electrical signal which provides a replica of the transmitted signal and the resultant product is time integrated. In the output part of an electrooptical correlator system a device which can perform a correlation function between one signal in the form of an optical image and a second signal in the form of a time variation of an electrical signal is required. A conversion device of interest is the image orthicon tube having most of the essential components for an electrooptical correlation. An area photocathode provided within an evacuated envelope converts the incident optical image into an electrical discharge image by means of primary photoelectrons. An electron lens system processes these signals by impingement on an insulating storage target member for integration. An electron gun and deflection system for controlling the initial insulating target potential and reading out the accumulated target charge during writing are disposed on the reverse side of the storage target member in what may be referred to as the electron multiplier and readout section to result in a correlation signal output. The main structure lacking in the normal image orthicon tube operating as a TV camera tube is the electrical input signal means required for the correlation operation.

Prior art attempts to adapt image orthicon type devices to perform the integration function for use in electrooptical correlation systems have resulted in operation of the storage target close to its critical voltage or "first crossover operating mode" to reduce the charge produced by uncorrelated signals. Operation at this critical voltage is unstable and attempts in this area have been relatively unsuccessful. Operation at voltages above the the critical voltage results in accumulation of positive charges from uncorrelated signals which drastically reduces the useable dynamic range and requires a periodic discharging cycle. In addition, modulation of the electron beam velocity produces drastic disturbances of the electron optical system focus.

Another area of interest in the utilization of image orthicon type devices resides in the attempt to inject the second electrical correlation input signal into one or more of the electrodes in the writing end of the conventional image orthicon device. In a copending United States application by Rudolf C. Hergenrother, Ser. No. 695,433, filed Jan. 3, 1968 and assigned to the assignee of the present invention, the entire photocurrent leaving the photocathode is modulated by an adjacent mesh electrode to which the second electrical correlation input signal is applied. In this operation mode the same voltages are applied as would be used in the operation of the image orthicon as a television camera tube. As a consequence there is a continual buildup of charge on the target member during the wirting cycle and where a correlated signal input is involved the buildup rate would be greater. Consequently, a large dc signal in the output read signal seriously limits the dynamic range and it is necessary to cancel out the charging effect of uncorrelated signals by operating the reading gun at a controlled low voltage of charging during the writing operation. It is therefore necessary to consider the so-called "dc term" in the photocathode mesh type configuration of the image orthicon device.

In electrooptical cross correlation signal processing systems, therefore, the requirement for an improved photoelectric translation means to perform the correlation operation and provide the high resolution displayed in TV camera applications is highly desirable.

SUMMARY OF THE INVENTION

In accordance with the teachings of the present invention an image orthicon device is provided having a planar barrier mesh electrode member disposed adjacent to and parallel with the target mesh member in the electron image section of the over-all device. An input correlation signal voltage applied to the biased barrier mesh does not affect the potential of the storage target by electric field induction because the target mesh electrode which is interposed between the barrier mesh and the storage target acts as an electrostatic shield. The barrier mesh member is biased at a potential such that the charging effect of the photocurrent on the storage target is zero. When a positive modulation voltage, however, is superimposed on the barrier mesh bias, relative to the target mesh, the secondary electrons produced at the storage target member by the photocurrent cause the target member to charge positively. When a negative modulation voltage is superimposed on the carrier mesh bias relative to the target mesh the photocurrent causes the storage target member to charge negatively. As a result, an uncorrelated input signal will cancel out to a zero charge effect on the storage target member. The correlated signals will have a non-zero average target current. The output signal characteristic therefore is substantially free of the "dc term". Both of these characteristics are highly desirable for devices employed in electrooptical correlation systems.

BRIEF DESCRIPTION OF THE DRAWINGS

The invention, as well as the specific details of the construction of an illustrative embodiment, will now be described, reference being directed to the accompanying drawings in which.

DESCRIPTION OF THE PREFERRED EMBODIMENT

Figure 1:
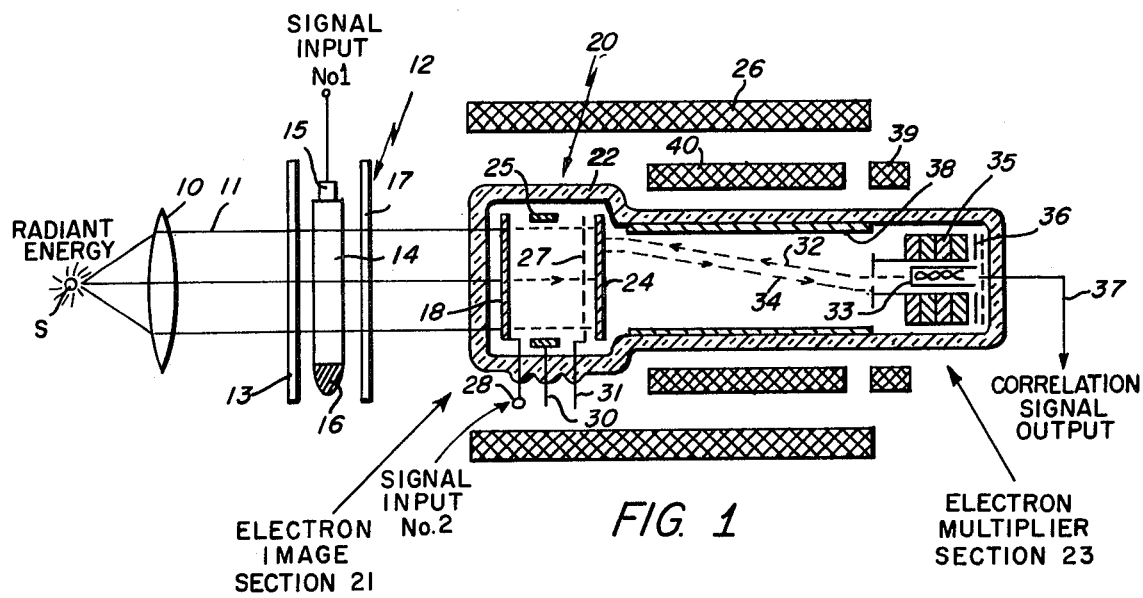
FIG. 1 is a schematic diagram of an electrooptical correlator system incorporating a prior art image orthicon device.

In FIG. 1 an exemplary electrooptical processing system coupled with a prior art image orthicon device is illustrated. In this embodiment radiant energy emanating from a source S is directed by means of lens 10 to form a collimated beam of rays 11 through an optical delay line modulator 12. The radiant energy beam is focused through a light polarizer 13 upon a solid state transparent optical delay line 14, preferably of a material such as fused quartz capable of supporting elastic waves upon stimulation by electrical input signals. The delay line element 14 comprises an input transducer 15 of the piezoelectric type for the application of an input signal from an external source. The opposing end of the optical delay line 14 is provided with a sonic energy absorber 16 to prevent the generation of undesirable reflections of the traversing acoustic energy.

A second light responsive means follows the optical delay line and comprises an analyzer or crossed polarizer 17. The emergent modulated light beam impinges upon a photosensitive cathode 18 of an image orthicon type tube 20 which provides by electrical converting and translating means the multiplication, integration and readout function required for the use intended.

Tube 20 broadly comprises a first section designated as the electron image section 21 at one end of a transparent envelope 22 with the opposing end of the envelope housing the electron multiplier and readout section 23.

The electron image section 21 includes a storage target member 24 whose surface can provide a secondary electron emission ratio substantially higher than unity. The light rays transmitted by the optical modulator 12 cause the semitransparent photocathode 18 to emit photoelectrons which, guided by a magnetic focusing field, impinge upon the storage target member 24, resulting in the generation of secondary electrons. An annular ring electrode 25 in combination with the magnetic field produced by focusing coil 26 is utilized to focus electrons leaving a point on the photocathode 18 to a corresponding point on the storage target member 24. A fine target mesh electrode 27 is disposed in front of the storage target member 24 and in the conventional image orthicon type tubes the target mesh electrode collects the secondary electrons released by the storage target member. A charge is thus stored on the storage target member surface which may become a few volts more positive than the target mesh screen in the areas receiving electrons from strongly illuminated areas of the photocathode. The photocathode is conventionally biased at a high negative voltage coupled to lead 28 while the focusing ring 25 is biased by a less negative voltage source by means of lead 30. The target mesh screen 27 is biased at near ground potential by means of lead 31.

The electron multiplier and readout section 23 comprises a low velocity electron scanning beam 32 generated by a reading gun assembly 33 of well known construction. The beam 32 scans the reverse side of target member 24 and deposits electrons in the areas corresponding to the positively charged areas of the electron image. The returning beam of electrons 34 will contact the anode member of the reading gun to be scattered, deflected and collected by the plurality of multiplying dynode electrodes 35 including collecting electrode 36 for coupling the correlated output signals by means of lead 37 to the external circuitry. The return beam signal modulation or readout signal is utilized in the cross correlation of signals in accordance with the system of the present invention.

A conductive coating 38 or other suitable metallic structure is disposed within the envelope 22 and is conventionally coupled to the high accelerating anode voltage used in the reading gun for internally focusing the scanning beam. An external alignment coil 39 is used to align the beam initially and is of well known construction. A deflecting magnetic coil 40 as well as focusing magnetic coil 26 are similarly externally disposed and through biasing in a conventional manner utilizing sawtooth voltage generators, the focusing and scanning functions with appropriate frequencies and variable voltages are supplied. The electrons in the electron beam neutralize the positive charges with more positive parts of the scanned target requiring a greater number of electrons during the readout operation. These portions of the scanned target represent the initially brighter areas of the optical image and require greater number of electrons than the darker areas. As a result the return or readout beam modulation will be the difference between the uniform currents arriving at the storage target member from the reading beam 32 and the current abstracted by this charging process resulting in a negative image relation to the optical image at the photocathode.

Earlier attempts to use the image orthicon tube as an electro-optical correlator involve the coupling of the input signal by means of lead 28 to the photocathode 18. This electrical signal input could be a replica of the transmitted signal pulses which, when combined with the optically delayed returning signals, was expected to provide the multiplication required. Problems inherent in the modulation of the photocathode potential for providing the second input modulation were experienced by numerous experimenters who attempted to operate at the prerequisite crossover voltage values. The aberrations of focus and redistribution of the charge from the storage target member by the returning secondary electrons became very critical when the energy with which the primary photoelectrons impinged upon the target member was reduced by reason of the application of the signal inputs directly to the photocathode. The problems encountered in the operation of this device have been enumerated in the aforementioned application and need not be reiterated further herein. Suffice it to say that the very critical voltages resulted in unstable operation of a conventional image orthicon tube for electrooptical correlation applications.

Figure 2:
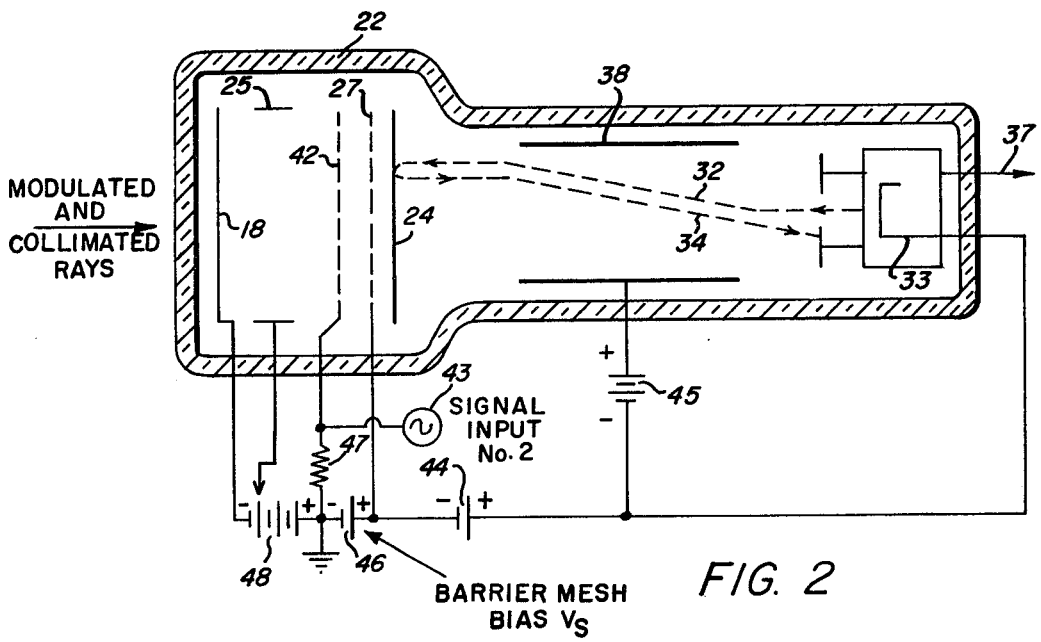
FIG. 2 is a schematic diagram of the illustrative embodiment of the invention.

In accordance with the teachings of the present invention and referring next to FIG. 2 the embodiment of the invention is illustrated. Where applicable similar structure disclosed in FIG. 1 has been similarly numbered. In this embodiment a barrier mesh electrode 42 is disposed adjacent to and parallel with the target mesh electrode 27. The spacing of the barrier electrode from the target mesh screen is illustratively 0.1 inch which is approximately 50 times the spacing between the target mesh and storage target. The signal input means for correlation purposes will be coupled to the barrier mesh electrode member from source designated generally by the numeral 43. The target mesh electrode 27 is biased by a small voltage provided by a supply 44 relative to the reading gun cathode which is biased along with the internal focusing member 38 by voltage supply 45. Barrier member 42 is biased negatively relative to the target mesh by a biasing supply 46 at such a level that at zero input signal to the member 42 the photocurrent produces no net change in electrical charge at the storage target member. A resistor 47 may be utilized in the biasing circuit for control of the barrier member potential. The photocathode 18 and focusing electrode 25 are biased by supply 48 to provide the control of the primary electrons induced by impingement of the modulated and collimated rays.

A voltage signal applied between the barrier mesh member and the target mesh electrode will have, desirably, a negligible effect on the electric field between the target mesh and the target member. In this manner the flow of secondary electrons between the storage target and target mesh screen will not be adversely affected by the barrier mesh potential. Secondary electrons, however, which escape and penetrate the target mesh screen will be considerably influenced by input signal voltages applied to the barrier mesh electrode in the region between these planar members.

Figure 3:
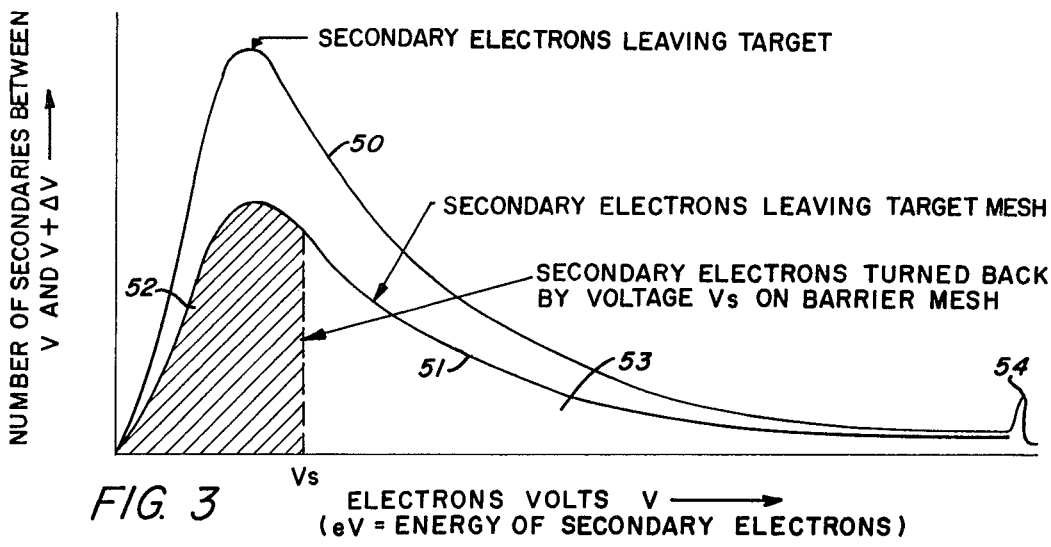
FIG. 3 is a diagram of a typical energy distribution of secondary electrons illustrating the effect of target mesh interception and signal mesh voltages.

To achieve a greater understanding of the principles of the present invention attention is now directed to FIG. 3 which illustrates the secondary electron interception considerations by the respective mesh screen members and the over-all effect on the charge redistribution on the storage target member. If the potential on the target mesh screen 27 is made substantially equal to the potential of the storage target member 24, or stated in another way, the bias supply 44 as shown in FIG. 2 is made zero, the region between the target mesh and storage target member surface will be field free. All the secondary electrons generated on the target member surface by the impingment of the primary electron will then be able to reach the target mesh screen 27. If the transmission coefficient of the target mesh is $\alpha_1$ a fraction of $\alpha_1$ of these secondaries will penetrate through the target mesh. Such electrons which penetrate the target mesh will have the same velocity distribution as those electrons leaving the storage target member 24. As a result the target mesh surface represents a virtual electron source which is essentially like that of the storage target member surface diminished by a factor referred to as $\alpha_1$. Now the curve 50 indicates the magnitude of the secondary electrons leaving the target member surface. Curve 51 indicates the magnitude of the secondaries leaving the target mesh screen having substantially the same velocity distribution as those secondaries leaving the storage target member.

If the barrier mesh electrode member is biased negatively with respect to the target mesh screen a retarding electric field is provided between this member and the target mesh screen. All secondary electrons penetrating the target mesh screen whose velocity component (perpendicular to the mesh screen) represents an electron energy of less than $V_s$ will be turned back by the barrier mesh electrode member. In the secondary electron distribution curve 51 the shaded area 52 represents those secondary electrons turned back by a voltage on the barrier mesh electrode member. The unshaded portion 53 of the curve represents those secondary electrons which are incident on the target member side of the barrier mesh electrode member. If it is next assumed that the barrier mesh has a transmission coefficient $\alpha_2$ which represents the fraction of incident electrons which pass through it while $(1 - \alpha_2)$ will represent the fraction of incident electrons which are intercepted by this member. The secondary electrons which pass through from the target mesh screen member will be turned around by the retarding electric field and again pass through or be intercepted by the barrier mesh electrode or the target mesh screen, respectively. Secondary electrons which traverse through both members will impinge upon the storage target member to contribute to the target negative charge.

In FIG. 3 the low peak 54 adjacent to the end of curve 50 represents the energy magnitude of primary electrons which did not interchange any energy and were merely turned around at the storage target member surface. The electrons of interest then in the signal modulation of the barrier mesh electrode member will be those secondary electrons in the shaded and unshaded portions of the curve 51 which interact with the target mesh screen and barrier mesh electrode member.

Figure 6:
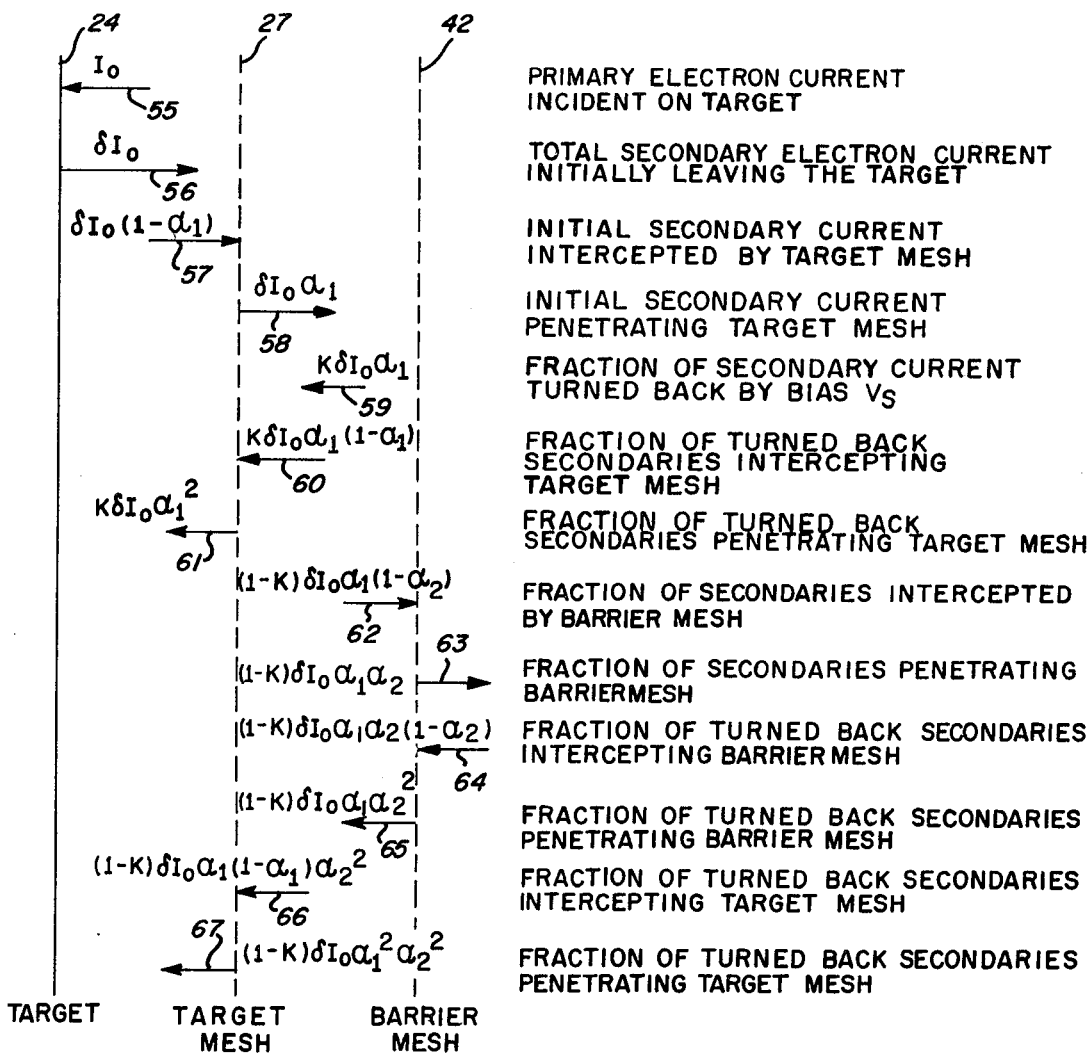
FIG. 6 is a diagrammatic presentation of a theoretical analysis of the electron currents within the electron image section at specific locations along the trajectory of the primary and secondary electrons.

Referring to FIG. 6, the theoretical considerations of the secondary electron currents in the electron image section adjacent to the storage target member will now be analyzed. The target member and respective mesh components have been designated by the same numerals hereinbefore employed in the description of FIGS. 1 and 2. The primary electrons incident upon the target 24 have a primary electron current designated $I_0$ as indicated by the arrow 55. A profusion of secondary electrons are released from the target surface having a secondary electron emission ratio of $\delta$. The total secondary electron current initially leaving the target 24 is indicated by the arrow 56 and the value of this current is $\delta I_0$.

If as stated hereinbefore the transmission coefficient for the target mesh screen member 27 is $\alpha_1$ then the expression $1 - \alpha_1$ will describe the closed part of the mesh screen member which intercepts the electrons. The electrons intercepted by the target mesh will be indicated by the arrow 57 and the equation $\delta I_0 (1 - \alpha_1)$. Those initial secondary electrons penetrating the target mesh screen will be indicated by the arrow 58 and equation $\delta I_0 \alpha_1$.

Next the factor $k$ is considered which represents in the analysis the fraction of secondary current reflected back by the vias $V_s$ on the barrier mesh electrode. Utilizing the same analogy the secondary electrons turned around by reason of the bias $V_s$ will have a small letter $k$ and the fraction of secondaries which get through are indicated by $1-k$. The transmission coefficient for the barrier mesh electrode member will be $\alpha_2$ and $1 - \alpha_2$ and indicates the secondaries intercepted by the barrier mesh electrode. Arrow 59 indicates the fraction of the secondary electrons which have been turned back by the bias on the barrier mesh electrode 42. The equation for this secondary electron current collected by target mesh 27 will be $k \delta I_0 \alpha_1 (1 - \alpha_1)$. Arrow 60 represents that portion of the current collected by target mesh 27. The electrons which penetrate the target mesh member again having the transmission coefficient $\alpha_1$ would be multiplied by another $\alpha_1$ to result in $\alpha_1^2$. The arrow 61 designates these penetrating secondaries and the derived expression indicative of the current is shown in FIG. 6 adjacent the arrow 61 as $k \delta I_0 \alpha_1^2$.

A fraction of the secondaries which do not penetrate the target mesh then will be intercepted by the barrier mesh electrode 42. These electrons are designated by the arrow 62 and the accompanying expression. Those secondaries penetrating the barrier mesh electrode are indicated by the arrow 63 together with the accompanying expression.

The retarding electric field in the electron image section will turn back substantially all of these penetrating secondaries. A portion of these electrons will be intercepted by this electrode while the remainder will penetrate the barrier mesh member. Arrows 64 and 65 indicate the intercepted and penetrating electrons respectively and the accompanying equations expressing the current follow the format heretofore enumerated with respect to the first traversals of the secondary electron.

Following the same analogy the reflected secondaries intercepting the target mesh screen member 27 are indicated by the arrow 66 and the penetrating secondaries which will impinge upon the target electrode surface are indicated by the arrow 67. In this manner the quantity of interest to indicate the total current to the storage target member designated by the symbol $I_T$ will now be evident from this analysis and add up to the following equation:

$$I_T = I_0 [1 + \delta \ k \ \alpha_1^2 + (1-k)\alpha_1^2 \alpha_2^2 - 1].$$

Figure 4:
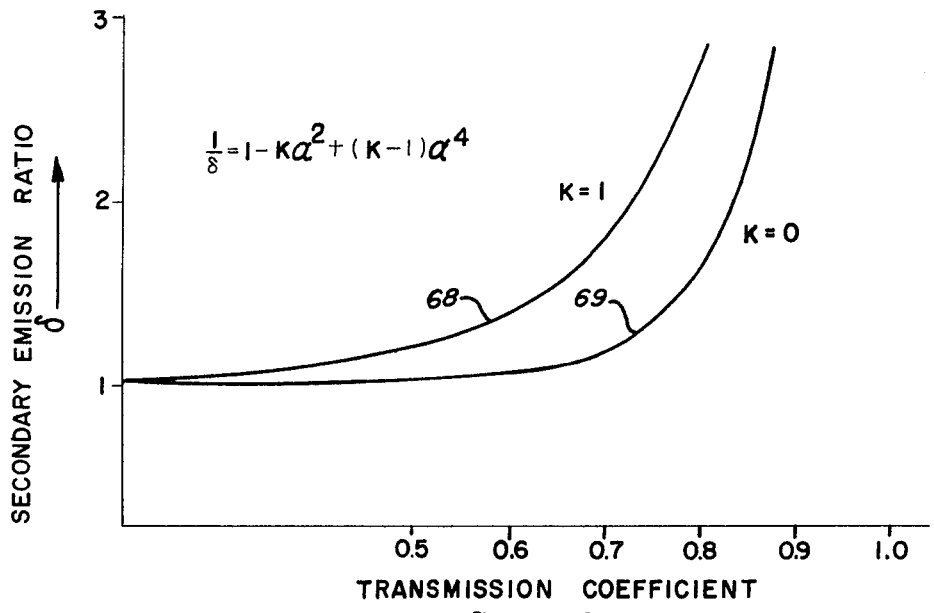
FIG. 4 is a graph illustrating the characteristics pertaining to the embodiment of the present invention.

Since it is desirable to operate the tube in such a manner that the target current ($I_T$) will be zero when there is no correlation input signal this can be accomplished by adjusting the value of $k$ which is equivalent to $f(V_s)$ with the bias voltage $V_s$ impressed on the mesh electrode by the biasing supply 46. The bias limits through which $k$ can be manipulated by controlling the barrier mesh bias voltage are zero to one. The limits of the range of the mesh transmission factors $\alpha_1$ and $\alpha_2$ are likewise zero to one. The values of $\delta$ bounded by these limits can be readily computed for the case where $\alpha_1 = \alpha_2$ which is the reasonable case to consider. Such data was computed and is shown in FIG. 4 with the values of $\delta$ which is the secondary emission ratio plotted along the vertical line and the values of $\alpha$ in the equation $1/\delta = 1-k \ \alpha^2 + (k-1)\alpha^4$ plotted along the horizontal line. The desirable point will be operative somewhere between curves 68 and 69. An input correlation signal then produces modulation of the value of $k$. It is also desirable to obtain the maximum modulation range that the barrier mesh bias be adjusted to produce a value of $k$ possibly near the one-half point. It will be noted that if the transmission coefficient is prescribed and $k$ is prescribed these two parameters will define the secondary emission ratio required for the target member. By adjusting the target mesh screen bias potential the effective secondary emission ratio of the target can be sufficiently adjusted to produce favorable modulation as required by the curves shown in FIG. 4. It will further be noted from this FIG. 4 that the increased transmission coefficient factor $\alpha$ favors increased modulation range for $k$.

Next, the polarity of the input correlation signal applied to the barrier mesh electrode member and its effect on the target member will be considered. If a signal of positive potential is superimposed on the barrier mesh bias this will oppose the negative bias potential of the barrier mesh electrode and will reduce the electric retarding field between the barrier mesh and target mesh electrode members. Consequently, fewer of the secondary electrons will be turned back by the barrier mesh and the value of $k$ will be decreased. As a result the target current $I_T$ will also be decreased. A decrease of target current means fewer electrons are arriving as a result of the signal voltage applied to the barrier mesh electrode. The fewer arriving electrons result in a less negative charge arriving on the target electrode surface than before so that the surface potential will charge in a positive direction. Such positive charging of the target will cause an increase of the electric field whereas the original input signal caused a decrease of the electric field. This charging action will continue until the potential difference between the target and barrier mesh reaches the level at which the target current has fallen to zero. It is therefore evident that the target electrode surface tends to follow in potential the input correlation signal potential variations impressed upon the barrier mesh electrode member.

Similarly, a negative potential impressed on the bias of the barrier mesh will result in similar variation in the target potential, only in the reverse direction. Consequently, the target member will charge in the negative direction until equilibrium is reached and the target current is again zero. An efficient correlation tool utilizing the image orthicon structure is therefore realizable and this mechanism will provide different responses to correlated and uncorrelated signals applied to the photocathode and barrier mesh inputs.

Figure 5:
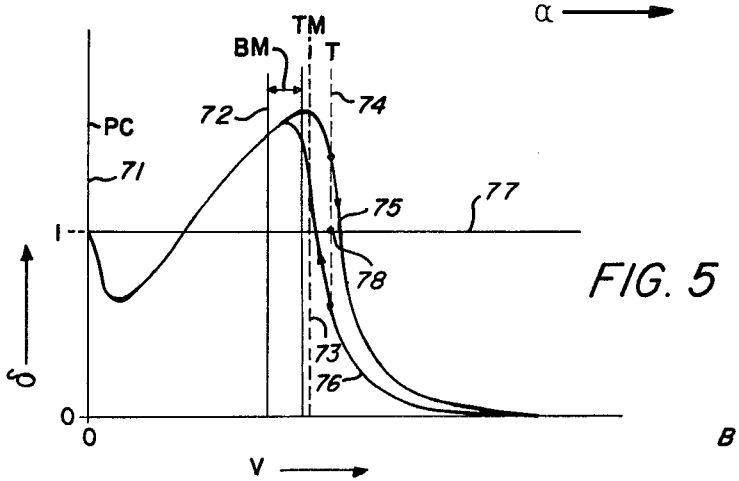
FIG. 5 is a graph illustrating the crossover mode of operation of the embodiment of the present invention.

In FIG. 5 a preferred operation mode is shown in which the secondary emission ratio versus voltage characteristics is controlled by the input signal potential. The barrier mesh member will reflect those secondary electrons which penetrate through the target mesh electrode and return these electrons to the target member. The secondary emission ratio and voltage characteristics of the storage target member are plotted along the horizontal and vertical axes as indicated by the symbols $v$ and $\delta$. The solid vertical line 71 indicates the photocathode surface. Line 72 indicates the barrier mesh electrode member and the line 73 indicates the target mesh electrode member while the line 74 indicates the storage target member. In the region between the barrier mesh and target mesh the behavior results in curves 75 and 76. These curves indicate the charging characteristics of the target member with signals of positive or negative potential impressed on the biased barrier mesh member. A positive signal on the barrier mesh will result in curve 75 and the dot on line 74 indicates a positive charge on the storage target member. The target potential therefore tends to follow the modulation signals on the barrier mesh. It will be noted that the target member comes to equilibrium again where the curve 75 falls to zero to the right of this intersecting point. in the reverse manner a negative signal results in curve 76 with the intersecting point now on the negative side. Again the equilibrium state of the target charge will be reached. The target charging mechanism therefore is stable by reason of a small biasing potential on a barrier mesh electrode.

Initially, in the operation of the device with the biased barrier member, the current from the photocathode to the target is balanced to zero which would result in a curve between the curves 75 and 76 crossing the line 77 at a point 78 where the secondary emission ratio is unity. The superimposed barrier mesh modulation then affects the target member charge which is read by the readout and multiplier section 23 to yield an output signal. In this intermediate crossover mode of operation many of the difficulties in the operation of the image orthicon device for correlation signal processing are obviated. This mode is much more acceptable to standard operating system procedures with available equipment to produce the desired correlation effects with enhanced resolution.

While a detailed illustrative embodiment has been shown and described herein, it is intended that this description be considered as exemplary only and not in a limiting sense in the interpretation of the broadest aspects of the invention as defined in the appended claims.

What is claimed is:

1. An electron discharge device comprising:
an evacuated envelope;
means defining an electron image section disposed adjacent to one end of said envelope;
said electron image section including a photocathode having a photosensitized surface for converting incident radiant energy rays into emitted primary photoelectrons disposed at one end;
a charge storage target member disposed at the opposing end of said section and having a surface coating of a material having a secondary electron emission ratio greater than unity;
a first planar conductive member disposed intermediately to said photocathode and said charge storage target member;
a second planar conductive member disposed intermediately to said first planar conductive member and said photocathode;
and means for coupling signals to said second conductive member to modulate the secondary electron emission current in the region between the target member and first conductive member and determine the charge potential on said target member.

2. An image orthicon electron discharge device comprising:
an evacuated envelope;
means defining an electron image section disposed adjacent to one end of said envelope;
means defining an electron signal multiplier and integrating section disposed within the remainder of said envelope;
said electron image section including a photocathode having a photosensitized surface for converting incident radiant energy rays into emitted photoelectrons disposed at one end;
a charge storage target member disposed at the opposing end of said section and having a surface coating of a material with a secondary electron emission ratio greater than unity;
a target mesh electrode member disposed adjacent to and parallel with said charge storage target member;
a barrier mesh electrode member disposed intermediately to said target mesh electrode member and said photocathode;
means for focusing said photoelectrons emitted from said photocathode onto said target member surface;
and means for coupling modulating electrical signals from an external source to said barrier mesh electrode member.

3. An electrooptical integrator device comprising:
an evacuated envelope;
a photocathode having a photosensitized surface for emitting photoelectrons upon incidence of energy waves disposed at one end of said envelope and converting said waves into electron discharge image signals;
means for electronically multiplying and integrating said electron image signals including a charge storage target member having a surface coating adapted to emit secondary electrons spaced from said photocathode;
means for focusing said emitted photoelectrons onto said target member;
a first conductive mesh member disposed adjacent to and parallel with said charge storage target member;
a second conductive mesh member disposed adjacent to and parallel with said first mesh member;
means biasing said first and second mesh members at predetermined potentials relative to said target member;
means for generating an electron scanning beam directed on the reverse side of said storage target member to read the potential of the charge stored thereon in accordance with the light intensity pattern of the electron image signals;
said second mesh member being biased relative to said first mesh member to establish a retarding electric field between said mesh members to reflect secondary electrons in this region back towards said charge storage target member surface;
means coupling an input electrical signal from an external source to said second mesh member superimposed upon said biasing potential to control the characteristics of the charge stored on said target member;
and means coupled to said scanning beam generation means for collecting and transmitting the multiplied and integrated electron image signals stored on said target member.

4. An electrooptical correlation system comprising:

a source of energy signals;
means for collimating and directing said signals in a beam to traverse an optical delay line modulator;

said modulator including means for introducing a first electrical correlation input signal to ultrasonically modulate the emergent beam signal pattern;

photoelectric conversion means for detecting and integrating said emergent beam signals comprising:
an evacuated envelope;
a photocathode adapted to emit photoelectrons;

a charge storage target member spaced from said photocathode and adapted to emit secondary electrons;

means for focusing said emitted photoelectrons onto said target member;

means for electrostatically controlling the charge on said target member;

said electrostatic means comprising a target mesh electrode member and spaced barrier electrode member disposed between the photocathode and target member;

said barrier mesh electrode member being biased negatively with respect to said target mesh electrode member to establish a retarding electric field between said members;

means for modulating said barrier mesh member by a second electrical correlation input signal to thereby control the storage target charge distribution;

and means for electronically scanning the reverse side of said charge storage target member to readout the product of said modulated electrical signals and deriving a correlated electrical output signal.

* * * * *